United States Patent [19]

Mitsuji et al.

[11] Patent Number: 4,900,774
[45] Date of Patent: Feb. 13, 1990

[54] AQUEOUS COATING COMPOSITION AND COATING METHOD USING SAME

[75] Inventors: Masaru Mitsuji, Zama; Mitsugu Endo, Kanagawa; Kaoru Morita, Hiratsuka; Yasuo Takaya, Kanagawa, all of Japan

[73] Assignee: Kansai Paint Company, Limited, Amagasaki, Japan

[21] Appl. No.: 149,304

[22] Filed: Jan. 28, 1988

[30] Foreign Application Priority Data

Feb. 6, 1987 [JP] Japan ................................. 62-26650

[51] Int. Cl.$^4$ ............................................. C08L 51/00
[52] U.S. Cl. ..................................... 524/512; 524/542
[58] Field of Search ................................ 524/512, 542

[56] References Cited

FOREIGN PATENT DOCUMENTS 0004221 1/1976 Japan ................................... 524/542
0036853 10/1978 Japan ................................... 524/542
0130782 11/1978 Japan ................................... 524/542
0179567 10/1984 Japan ................................... 524/516

Primary Examiner—Joseph L. Schofer
Assistant Examiner—J. M. Reddick
Attorney, Agent, or Firm—Armstrong, Nikaido, Marmelstein, Kubovcik & Murray

[57] ABSTRACT

An aqueous coating composition characterized in that the composition comprises:
(A) a water-dispersible film-forming acrylic polymer,
(B) a crosslinking agent prepared by dispersing a hydrophobic melamine resin in water in the presence of a water-soluble resin, the hydrophobic melamine resin being up to about 20 in solvent dilution ratio when diluted with a water/methanol solvent mixture (35/65 in weight ratio) and about 500 to about 4000 in weight average molecular weight, and
(C) a pigment.

The composition is very suitable for use in the two-coat one-bake coating method as a base-coat composition.

5 Claims, No Drawings

AQUEOUS COATING COMPOSITION AND COATING METHOD USING SAME

The present invention relates to a novel aqueous coating composition and a coating method using the composition.

The external plates of motor vehicles, two-wheel vehicles, electric products, etc. which must have a beautiful appearance are chiefly coated by a two-coat one-bake method comprising coating the plate with a base-coat composition containing pigments such as metallic pigment and coloring pigment, applying a transparent top-coat composition to the coating while the coating is still uncured and curing the two coatings at the same time by heating.

From the viewpoint of environmental problems and savings in resources, it has been strongly desired in recent years to reduce the quantities of organic solvents to be used, and investigations are under way on base-coat compositions for a change-over from organic solvent compositions to aqueous compositions.

Aqueous coating compositions generally have the problem that the coating operation is greatly governed by the coating conditions, especially by the humidity condition since the diluent is water. The problem is attributable to the fact that water, which has a great latent heat of evaporation, fails to evaporate off effectively while the composition is being applied as by spray coating or after the composition is applied to articles, consequently producing only a small variation in the viscosity of the composition to render the composition liable to defects such as sagging or mottling. Aqueous coating compositions are further difficult to improve in spray workability since it is impossible to adjust the rate of evaporation with a diluent unlike the coating compositions of the organic solvent dilution type.

To improve aqueous coating compositions in spray workability, U.S. Pat. No. 4,539,363 proposes use of fine polymer particles which are stabilized sterically and which are prepared by subjecting a suitable monomer in an aqueous medium in the presence of a special emulsifier termed steric stabilizer, so as to give pseudoplasticity or thixotropy to such a composition in its entirety. The patent publication also discloses that a hydrophilic melamine resin which is soluble in aqueous media and has a low molecular weight is usable as a crosslinking agent.

However, such aqueous coating composition is limited in the proper range of humidities required for coating operation to give coatings which are free of defects such as sagging or mottling and is prone to such defects especially at high humidities. With the coating line employed for motor vehicles, two-wheel vehicles, electric products, etc., this problem leads to more serious problems such as increased expenditure for humidity adjustment for coating operation and instability of the quality of coatings. It is therefore strongly desired to overcome the problems.

An object of the present invention is to provide a novel aqueous coating composition which is well-suited as a base-coat composition for use in the two-coat one-bake coating method.

Another object of the invention is to provide a novel aqueous base-coat composition having high storage stability and greatly improved in spray workability.

Another object of the invention is to provide a novel two-coat one-bake coating method which can be practiced with a very high efficiency to give a satisfactory finish.

These and other objects of the invention will become apparent from the following description.

The present invention provides an aqueous coating composition which is characterized in that the composition comprises:

(A) a water-dispersible film-forming acrylic polymer, (B) a crosslinking agent prepared by dispersing a hydrophobic melamine resin in water in the presence of a water-soluble resin, the hydrophobic melamine resin being up to about 20 in solvent dilution ratio when diluted with a water/methanol solvent mixture (35/65 in weight ratio) and about 500 to about 4000 in weight average molecular weight, and (C) a pigment.

The invention further provides a two-coat one-bake coating method which is characterized by the use of the above composition as a base-coat composition.

In view of the present situation described above, we have carried out intensive research and obtained the following novel findings.

(1) An aqueous coating composition prepared from a water-dispersible film-forming acrylic polymer and a cross-linking agent has good stability, is diminished in the rise of viscosity during storage and therefore has high storage stability, the crosslinking agent being prepared by dispersing a hydrophobic melamine resin, especially one having a specific solvent dilution ratio, in a water-soluble resin, although the melamine resin has not been used as a crosslinking agent for aqueous coating compositions.

(2) The aqueous coating composition is useful as a base-coat composition which is highly amenable to a coating operation, giving a coating free of defects, such as sagging or mottling, over a wide humidity range.

(3) By using the aqueous coating composition, the two-coat one-bake coating method can be practiced efficiently to produce a satisfactory finish.

The present invention has been accomplished base on these findings.

The water-dispersible film-forming acrylic polymer serving as the base resin of the aqueous coating composition of the invention is, for example, a known aqueous dispersion, about 0.05 to about 1.0 μm in mean particle size, which is prepared by polymerizing an acrylic monomer and, when required, other polymerizable monomer, in the presence of a dispersion stabilizer such as polyoxyethylene nonyl phenyl ether or like nonionic surfactant, polyoxyethylene alkyl allyl ether sulfuric acid ester salt or like anionic surfactant, or acrylic resin or like water-soluble resin about 20 to about 150 in acid value and about 5000 to about 30000 in number average molecular weight.

Examples of useful monomers for polymerization are α,β-ethylenically unsaturated carboxylic acids such as (meth)acrylic acid, maleic acid, fumaric acid, itaconic acid and half-ester of meleic acid or fumaric acid; (meth)acrylates such as methyl (meth)acrylate, ethyl (meth)acrylate, propyl (meth)acrylate, butyl (meth)acrylate and 2-ethylhexyl (meth)acrylate; hydroxy-containing (meth)acrylates such as hydroxyethyl (meth)acrylate and hydroxypropyl (meth)acrylate; and other monomers such as N-propoxymethyl (meth)acrylamide, N-butoxymethyl (meth)acrylamide, glycidyl (meth)acrylate, styrene and vinyl acetate.

When required, the above useful monomers can be used conjointly with a polyfunctional monomer such as ethylene glycol di(meth)acrylate, 1,6-hexane di(meth)acrylate, trimethylolpropane di(meth)acrylate, allyl (meth)acrylate and trimethylolpropane triacrylate. Such monomer, when used, crosslinks the dispersed particles, giving the resulting acrylic polymer improved mechanical stability, storage stability, etc.

The water-dispersible film-forming acrylic polymer to be used in the invention is prepared preferably by a multi-stage polymerization process, i.e., by polymerizing a monomer containing a small amount of or no $\alpha,\beta$-ethylenically unsaturated acid first and subsequently copolymerize the resulting polymer with a monomer containing a large amount of $\alpha,\beta$-ethylenically unsaturated acid. The emulsion obtained increases in viscosity when neutralized with a neutralizing agent and is therefore desirable in view of the amenability to coating operation. Examples of useful neutralizing agents are ammonia and water-soluble amino compounds such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine and morpholine. Among these, tertiary amines, i.e. triethylamine and dimethylethanolamine, are especially desirable.

To fulfill the objects of the invention, the water-dispersible film-forming acrylic polymer is useful also when it is made to have an increased viscosity by the addition of an acrylic resin having a high acid value or a thickener.

When required, the water-dispersible film-forming acrylic polymer is usable in combination with a water-dispersible polyester or polyurethane resin prepared by a known process.

According to the present invention, it is essential to use a crosslinking agent which is prepared by dispersing a hydrophobic melamine resin in water in the presence of a water-soluble resin, the melamine resin being up to about 20 in solvent dilution ratio when diluted with a water/methanol solvent mixture (35/65 in weight ratio) and about 500 to about 4000 in weight average molecular weight. The presence of the crosslinking agent remarkably improves the storage stability of the composition and the amenability thereof to coating operation. Although the reason for the remarkable effect still remains to be fully clarified, the effect appears attributable to the fact that the crosslinking agent is in the form of a very stable dispersion and also to the fact that the present coating composition comprising the component A is dispersible in water and is therefore greatly variable in viscosity with variations in the amount of solvent, such that when applied, the composition increases greatly in viscosity and can therefore be free of sagging, mottling or like defects.

The hydrophobic melamine resin providing the crosslinking agent for use in the invention is up to about 20, preferably about 18 to 0.1, in the above-mentioned solvent dilution ratio, and about 500 to about 4000, preferably about 800 to about 3000, in weight average molecular weight, as determined by GPC using polystyrene. If the solvent dilution ratio exceeds 20, the resin becomes hydrophilic, giving the composition lower storage stability and impaired amenability to coating, hence undesirable. Further if the weight average molecular weight is less than 500, the resin becomes hydrophilic similarly to impair the storage stability and coating amenability of the composition. When the molecular weight exceeds 4000, the coating obtained will exhibit an impaired finish, and the finish, when metallic, fails to exhibit the desired brightness, hence undesirable.

The melamine resin is not limited specifically insofar as it fulfills the dilution ratio and molecular weight requirements. The resin is usable as etherified variously, for example, as modified with at least one of methyl alcohol, ethyl alcohol, isopropyl alcohol, n-butyl alcohol, isobutyl alcohol, octyl alcohol, 2-ethylhexyl alcohol, benzyl alcohol, etc. According to the invention, it is suitable to use the resin as modified with an alcohol having at least four carbon atoms, more preferably four to seven carbon atoms. The amount of ether groups in the melamine resin, although not limited specifically, is suitably up to about 5 moles, preferably about 1.5 to about 3 moles, per triazine ring. Further as to the functional groups such as amino, imino and methylol, the kind and amount of remaining functional groups are not limited specifically provided that the foregoing dilution ratio and molecular weight requirements are satisfied. Usually, however, the amount of imino groups (inclusive of amino groups), as well as of methylol groups, is 0.2 to 2.0 moles, preferably 0.5 to 1.5 moles, per triazine ring.

The solvent dilution ratio used in the present invention is an index indicating the solubility of melamine resin in hydrophilic solvents. The lower the ratio, the more hydrophobic is the resin. The solvent dilution ratio is determined by the following method. Two grams of melamine resin is placed into a 50-cc beaker, which is then placed on paper bearing a print of No. 5 type. Subsequently, at 25° C. a mixture of water and methanol (35/65 in weight ratio) is added dropwise to the resin with stirring until the print becomes illegible. The amount (cc) thus added is divided by the amount of the melamine resin to obtain a value (cc/g) as the ratio.

The water-soluble resin for use in preparing the crosslinking agent chiefly serves to disperse the hydrophobic melamine resin in water and is a known one. As a rule, it is a resin having introduced therein a quantity of hydrophilic groups, such as carboxyl (—COOH), hydroxyl (—OH), methylol (—CH$_2$OH), amino (—NH$_2$), sulfo (—SO$_3$H) or polyoxyethylene bond (-(-CH$_2$C-H$_2$O-)$_n$-), sufficient to render the melamine resin soluble in water. Most typical of such water-soluble resin is one having carboxyl groups introduced therein, neutralized to an alkali salt and thereby made soluble in water. The amount of carboxyl groups to be introduced is about 5 to about 80, preferably about 10 to about 50, in terms of the acid value of the resin although variable depending on the skeleton of the resin, the content of other hydrophilic groups, the kind of neutralizing agent, equivalent weight for neutralization, etc. If the acid value is less than 5, the hydrophobic melamine resin will not be fully dispersible in water, whereas if the acid value is above 80, the composition tends to become viscous and less stable during storage, hence undesirable. Examples of neutralizing agents useful for rendering the resin water-soluble are ammonia and the aforementioned water-soluble amino compounds.

Examples of useful water-soluble resins are acrylic resins, alkyd resins, epoxy resins, etc. Acrylic resins include copolymers prepared from $\alpha,\beta$-ethylenically unsaturated carboxylic acids, (meth)acrylates having hydroxyl, amido, methylol or like functional group, (meth)acrylic acid amide or the like and non-functional (meth)acrylates, styrene or the like. Alkyd resins are prepared from the same materials as conventional solvent-type alkyd resins and are those prepared by subjecting a polybasic acid, polyhydric alcohol and modified oil to condensation reaction in the usual manner. Epoxy resins are epoxy ester resins which are prepared, for example, by synthesizing an epoxy ester by the reaction of epoxy group with an unsaturated fatty acid and adding an $\alpha,\beta$-unsaturated acid to the unsaturated group, or by esterifying the hydroxyl group of an epoxy ester with a polybasic acid such as phthalic acid or trimellitic acid.

Generally it is suitable to use the hydrophobic melamine resin and the water-soluble resin in the ratio of about 20 to about 100 parts by weight, preferably about 28 to about 80 parts by weight, of the latter per 100 parts by weight of the former calculated as solids. Use of less than 20 parts by weight of the water-soluble resin is not desirable since the aqueous dispersion of hydrophobic melamine resin serving as the crosslinking agent then comprises particles of increased mean size and tends to impair the storage stability of the aqueous coating composition and the amenability thereof to coating operation. Presence of more than 100 parts by weight of the water-soluble resin is not desirable either, since impaired storage stability and coating amenability will then result although the mean particle size of the dispersion remains almost unchanged.

The crosslinking agent to be used in the invention can be prepared, for example, by dispersing the hydrophobic melamine resin and water-soluble resin in water in the following manner. First, the two resins uniformly mixed together usually in the above-mentioned ratio using dissolver, homomixer, ball mill, sand mill or the like. When required, a coloring pigment, extender pigment, etc. may be admixed with the resins in this step. Further when required, a small amount of hydrophillic solvent, such as alcohol solvent or ether solvent, can be added to the resins in this step. Next, deionized water is added in small portions to the mixture in about 0.5 to about 5 times the combined amount by weight of the two resins while vigorously stirring the mixture, whereby a crosslinking agent is obtained in the form of a milky white or colored aqueous dispersion. When free from pigment, the dispersion is about 0.05 to about 0.5 $\mu$m in mean particle size. While the mixture may be stirred to a suitably adjusted extend during the addition of deionized water in accordance the type of stirred used, the amounts of ingredients, etc., it is suitable to stir the mixture for about 15 to about 60 minutes in the case of dissolver which is driven at about 1000 to about 1500 r.p.m.

The pigments to be used in the invention are metallic pigments and/or coloring pigments which are usually used for coating compositions. Examples of useful metallic pigments are aluminum flake, copper bronze flake, etc. Examples of useful coloring pigments are titanium dioxide, iron oxide, chromium oxide, lead chromate, carbon black and like inorganic pigments, Phthalocyanine Blue, Phthalocyanine Green, Carbazole Violet, Anthrapyrimidine Yellow, Flavanthrone Yellow, Isoindoline Yellow, Indanthrone Blue, Quinacridone Violet and like organic pigments.

At least one of such metallic pigments and coloring pigments is used according to the invention. An extender pigment such as talc or kaolin in conjointly usable. Of these pigments, the coloring pigment and the extender pigment is added preferably during the preparation of the crosslinking agent (component (B)), while it is desirable to add the metallic pigment to the components (A) and (B) when they are mixed together.

Although not limited specifically, the proportions of the components for preparing the present composition are suitably as follows. The crosslinking agent prepared by dispersing the hydrophobic melamine resin in water in the presence of a water-soluble resin, i.e. the component (B), is used in an amount of about 8 to about 65 parts by weight, preferably about 10 to about 55 parts by weight, calculated as the solids content of the melamine resin, per 100 parts by weight of the water-dispersible film-forming acrylic polymer, i.e. component (A), calculated as resin solids. When the proportion of the component (B) is less than 8 parts by weight, the curing reaction due to heating fails to proceed to a full extent, so that the coating obtained tends to exhibit impaired resistance to moisture and solvents. Proportions over 65 parts by weight are undesirable because the coating will then have lower resistance to chipping and weather and further because the coating permits sagging or mottling of a transparent top-coat composition when coated therewith. The pigment as the component (C) may be used in a suitable amount according to the desired color to be given to the composition. It is usually suitable to use about 1 to about 250 parts by weight of this component per 100 parts by weight of the combined amount of the components (A) and (B) calculated as resin solids.

The aqueous coating composition of the present invention can be prepared, for example, in the following manner. Deionized water and, when required, additives such as thickener and defoaming agent are admixed with the crosslinking agent prepared as above, the water-dispersible film-forming acrylic polymer and a metallic pigment (when the composition is used for metallic coating), and the mixture is made into a composition by the usual method so that the composition contains about 10 to about 40 wt. % of solids and has a viscosity of about 800 to about 5000 cps/6 r.p.m. (B-type viscometer).

The aqueous coating composition of the invention is very advantageously usable as a base-coat composition by the two-coat one-bake coating method. For example, the composition is applied to an article as by spray coating so as to form a coating of about 10 to about 50 $\mu$m in dry thickness and then dried in air or hot air until the volatile content of the coating reduces to about 25 wt. % or lower. A transparent top-coat composition is then applied as by electrostatic spray coating to the resulting coating to a dry thickness of about 15 to about 70 $\mu$m. Subsequently, the coated article is set in a usual oven and then heated to about 120° to about 160° C. for about 15 to about 30 minutes to cure the coatings. The present composition is highly amenable to the coating operation, readily forming a beautiful coating.

The transparent top-coat composition can be a known one. Examples of such compositions are aminoalkyd resin, acrylic resin, aminoacrylic resin, amino oil-free alkyd resin, silicone polyester resin, fluorocarbon resin, urethane resin and like coating compositions of the organic solvent dilution type. Further the top-coat composition is preferably of the highly solid type which is reduced in the amount of organic solvent used from the viewpoint of environmental problems and savings in resources. A powder coating composition is also usable.

The crosslinking agent incorporated in the aqueous coating composition gives the following advantages to the composition.

(1) The present composition, which has suitable pseudo-plasticity and thixotropy, is usable over a wide humidity range, almost without sagging or mottling or like defects even at a high humidity. The composition therefore has greatly improved amenability to coating operation.

(2) The present composition has high dispersion stability and is therefore greatly improved in storage stability.

(3) The presence of the hydrophobic melamine resin serving as the crosslinking agent gives the composition improved coating properties with respect to moisture resistance, adhesion, etc.

(4) The present composition is usable as a base-coat composition by the two-coat one-bake coating method with a greatly reduced amount of organic solvent and is therefore advantageous from the viewpoint of environmental problems and savings in resources.

(5) The present composition is very suitable for use as a base-coat composition by the two-coat one-bake coating method, for example, for application to external plates or panels of motor vehicles, two-wheel vehicles and electric products which must have a beautiful appearance. Especially, the composition is usable for metallic coating and ornamental coating with high efficiency to give a satisfactory finish.

The invention will be described in greater detail with reference to the following preparation examples, examples and comparative examples, wherein the parts and percentages are all by weight.

PREPARATION EXAMPLE 1

Preparation of Component (A), Acrylic Polymer

Into a reactor were placed 140 parts of deionized water, 2.5 parts of 30% "Newcol 707SF" (anionic surfactant, product of Nippon Nyukazai Co., Ltd.) and 1 part of the monomer mixture (1) given below, followed by stirring in a nitrogen stream, and further by addition of 3% ammonium persulfate at 60° C. Subsequently, the mixture was heated to a temperature of 80° C. A monomer mixture comprising 79 parts of the monomer mixture (1), 2.5 parts of 30% "Newcol 707SF", 4 parts of 3% ammonium persulfate and 42 parts of deionized water was thereafter placed into the reactor by a metering pump over a period of 4 hours. After the completion of addition, the mixture was aged for 1 hour.

At 80° C., 20.5 parts of the following monomer mixture (2) and 4 parts of 3% aqueous solution of ammonium persulfate were concurrently placed dropwise into the reactor over a period of 1.5 hours. After the completion of addition, the resulting mixture was aged for 1 hour, then diluted with 30 parts of deionized water and filtered with 200-mesh nylon cloth at 30° C. Deionized water was added to the filtrate, and the pH of the mixture was adjusted to 7.5 with dimethylethanolamine, giving an aqueous dispersion of acrylic resin having a mean particle size of 0.1 μm and a nonvolatile content of 20%.

| Monomer mixture (1) | |
|---|---|
| Methyl methacrylate | 55 parts |
| Styrene | 10 parts |
| n-Butyl acrylate | 9 parts |
| 2-Hydroxyethyl acrylate | 5 parts |
| Methacrylic acid | 1 part |
| Monomer mixture (2) | |
| Methyl methacrylate | 5 parts |
| n-Butyl acrylate | 7 parts |
| 2-Ethylhexyl acrylate | 5 parts |
| Methacrylic acid | 3 parts |
| 30% "Newcol 707SF" | 0.5 part |

PREPARATION EXAMPLE 2

Preparation of Water-soluble Resin

Into a reactor were placed 60 parts of butyl cellosolve and 15 parts of isobutyl alcohol, which were then heated to 115° C. in a nitrogen stream, whereupon a mixture of 26 parts of n-butyl acrylate, 47 parts of methyl methacrylate, 10 parts of styrene, 10 parts of 2-hydroxyethyl methacrylate, 6 parts of acrylic acid and 1 part of azoisobutyronitrile was placed into the reactor over a period of 3 hours. After the completion of addition, the mixture was aged at 115° C. for 30 minutes, a mixture of 1 part of azobisisobutyronitrile and 115 parts of butyl cellosolve was added to the mixture over a period of 1 hour, and the resulting mixture was aged for 30 minutes and filtered with 200-mesh nylon cloth at 50° C.

The reaction product obtained was 48 in acid value, $Z_4$ in viscosity (Gardener bubble viscometer) and 55% in nonvolatile content. The product was neutralized with the equivalent of dimethylethanolamine. With addition of deionized water, the product gave 50% aqueous solution of acrylic resin.

PREPARATION EXAMPLE 3

Preparation of Hydrophobic Melamine Resin A

Into a 2-liter four-necked flask equipped with a thermometer, stirrer and reflux condenser were placed 126 parts of melamine, 225 parts of 80% paraformalin (product of Mitsui Toatsu Chemical Co., Ltd.) and 592 parts of n-butanol. After adjusting the mixture to a pH of 9.5 to 10.0 with 10% aqueous solution of caustic soda, the mixture was reacted at 80° C. for 1 hour.

n-Butanol (888 parts) was added to the reaction mixture and the resulting mixture was adjusted to a pH of 5.5 to 6.0 with 5% aqueous solution of sulfuric acid and reacted at 80° C. for 3 hours. The reaction mixture was neutralized to a pH of 7 to 7.5 with 20% aqueous solution of caustic soda, concentrated at 60° to 70° C. in a vacuum to remove the n-butanol and then filtered, giving a melamine resin A.

When analyzed, the resin was found to be 80% in nonvolatile content, 3.6 in the solvent dilution ratio in a solvent mixture of water/methanol (35/65 in weight ratio) (hereinafter referred to merely as "dilution ratio") and 800 in weight average molecular weight.

PREPARATION EXAMPLE 4

Preparation of Hydrophobic Melamine Resin B for Comparison

Melamine (126 parts), 180.0 parts of 80% paraformalin, 592 parts of n-butanol and 72.0 parts of deionized water were placed into a 2-liter four-necked flask equipped with a thermometer, stirrer, reflux condenser and water separator. Over a period of 3 hours, 86 parts of water was removed from the mixture by refluxing. With addition of 0.5 part of phthalic anhydride, the mixture was thereafter heated to 65% residue at atmospheric pressure to remove the n-butanol. The reaction mixture was cooled and filtered, affording a melamine resin B.

When analyzed, the resin was found to be 65% in nonvolatile content, 0.3 in dilution ratio and 4500 in weight average molecular weight.

PREPARATION EXAMPLE 5

Preparation of Hydrophobic Melamine Resin C

The melamine resin A (500 parts) and 320 parts of methanol were placed into a 2-liter four-necked flask equipped with a thermometer, stirrer and reflux condenser, and the mixture was adjusted to an acid value of 1.0 with formic acid. The mixture was then reacted at 65° C. for 6 hours. After the reaction, the formic acid was neutralized with 1% aqueous solution of caustic soda, and the mixture was concentrated at 40° to 60° C. in a vacuum to remove the methanol and filtered, giving a melamine resin C.

When analyzed, the resin was found to be a methyl-butyl mixed etherified melamine resin, which was 70% in nonvolatile content, 17.3 in dilution ratio and 1400 to 1800 in weight average molecular weight.

PREPARATION EXAMPLE 6

Preparation of Hydrophilic Melamine Resin D for Comparison

Melamine (126 parts), 165 parts of 80% paraformalin, 1110 parts of n-butanol and 57 parts of deionized water were placed into a 2-liter four-necked flask equipped with a thermometer, stirrer, reflux condenser and water separator. Over a period of 5 hours, 72 parts of water was removed from the mixture by refluxing. The reaction mixture was then concentrated in a vacuum to a predetermined concentration to remove the n-butanol, water and formaldehyde. The concentrate was then cooled and filtered, giving a melamine resin D.

When analyzed, the resin was found to be 70% in nonvolatile content, 25.0 in dilution ratio and 1000 to 1400 in weight average molecular weight.

PREPARATION EXAMPLE 7

Preparation of Crosslinking Agent

The hydrophobic melamine resin A prepared in Preparation Example 3, in an amount of 25 parts calculated as solids, was placed into a stirring container. The aqueous acrylic resin solution (20 parts) obtained in Preparation Example 2 was added to the resin. While stirring the mixture by a dissolver at 1000 to 1500 r.p.m., 80 parts of deionized water was added in small portions to the mixture, followed by further stirring for 30 minutes to obtain a crosslinking agent H-1 in the form of an aqueous dispersion which was 0.11 μm in mean particle size.

PREPARATION EXAMPLE 8

Preparation of Crosslinking Agent

A crosslinking agent H-2 in the form of an aqueous dispersion and 0.12 μm in mean particle size was prepared exactly in the same manner as in Preparation Example 7 except that the hydrophobic melamine resin A was replaced by a commercial hydrophobic melamine resin E ("Super Beckamine," product of Dainnippon Ink & Chemicals Inc., nonvolatile content 75%, dilution ratio 0.5, weight average molecular weight 1400–1800).

PREPARATION EXAMPLE 9

Preparation of Crosslinking Agent

A crosslinking agent H-3 in the form of an aqueous dispersion and 0.13 μm in mean particle size was prepared exactly in the same manner as in Preparation Example 7 except that the hydrophobic melamine resin A was replaced by the hydrophobic melamine resin C obtained in Preparation Example 5.

PREPARATION EXAMPLE 10

Preparation of Crosslinking Agent

A crosslinking agent H-4 in the form of an aqueous dispersion and 0.15 μm in mean particle size was prepared exactly in the same manner as in Preparation Example 7 except that the hydrophobic melamine resin A was replaced by a commercial hydrophobic melamine resin F ("Uban 28SE," product of Mitsui Toatsu Chemical Co., Ltd., nonvolatile content 60%, dilution ratio 5.8, weight average molecular weight 1800–2000).

PREPARATION EXAMPLE 11

Preparation of Crosslinking Agent

A crosslinking agent H-5 in the form of an aqueous dispersion and 0.15 μm in mean particle size was prepared exactly in the same manner as in Preparation Example 7 except that the hydrophobic melamine resin A was replaced by a commercial hydrophobic melamine resin G ("Uban 20SE," product of Mitsui Toatsu Chemical Co., Ltd., nonvolatile content 60%, dilution ratio 0.4, weight average molecular weight 3000–4000).

PREPARATION EXAMPLE 12

Preparation of Comparative Crosslinking Agent

A crosslinking agent H-6 in the form of an aqueous dispersion and 0.17 μm in mean particle size was prepared exactly in the same manner as in Preparation Example 7 except that the hydrophobic melamine resin A was replaced by the comparative hydrophobic melamine resin B obtained in Preparation Example 4.

PREPARATION EXAMPLE 13

Preparation of Comparative Crosslinking Agent

A water-soluble crosslinking agent H-7 was prepared exactly in the same manner as in Preparation Example 7 except that the hydrophobic melamine resin A was replaced by a comparative hydrophilic melamine resin H ("Cymel 325," product of Mitsui Toatsu Chemical Co., Ltd., nonvolatile content 81%, dilution ratio at least 25, weight average molecular weight 700).

PREPARATION EXAMPLE 14

Preparation of Comparative Crosslinking Agent

A water-soluble crosslinking agent H-8 was prepared exactly in the same manner as in Preparation Example 7 except that the hydrophobic melamine resin A was replaced by the comparative hydrophilic melamine resin D obtained in Preparation Example 6.

PREPARATION EXAMPLE 15

Preparation of Aluminum Pigment Concentrate

An aluminum paste (23 parts, metal content 65%) and 25 parts of butyl cellosolve were placed into a stirring container and stirred for 1 hour to obtain an aluminum pigment concentrate.

PREPARATION EXAMPLE 16

Preparation of Transparent Top-coat Composition

An acrylic resin solution containing 60% of resin solids was prepared by polymerizing 25 parts of methyl acrylate, 25 parts of ethyl acrylate, 36.5 parts of n-butyl acrylate, 12 parts of 2-hydroxyethyl acrylate and 1.5 parts of acrylic acid in xylene in the presence of 2.5 parts of a polymerization initiator ($\alpha,\alpha'$-azobisisobutyronitrile). The resin was 58 in hydroxyl value and 12 in acid value.

The resin and "Uban 20SE" were mixed together in the solids weight ratio of 75:25, and the mixture was adjusted to a viscosity of 25 seconds (Ford cup No.4/20° C.) with "Swasol #1500" (organic solvent, product of Cosmo Oil Co., Ltd.) to obtain a clear coat composition T-1.

PREPARATION EXAMPLE 17

Preparation of Transparent Top-coat Composition

A clear coat composition T-2 was prepared in the same manner as in Preparation Example 16 except that "Duranate 24A" (water adduct of hexamethylene diisocyanate, product of Asahi Chemical Industry Co., Ltd.) used in place of "Uban 20SE" was mixed with the acrylic resin in the OH/NCO mole ratio of 1/1.

PREPARATION EXAMPLE 18

Preparation of transparent top-coat composition

Into a three-necked flask equipped with a stirrer and a reflux condenser were placed 20 parts of styrene, 43 parts of methyl methacrylate, 18 parts of n-butyl acrylate, 3 parts of ethyl acrylate, 13 parts of glycidyl methacrylate, 3 parts of hydroxyethyl methacrylate and 100 parts of toluol. With addition of 1.5 parts of benzoyl peroxide, the mixture was heated to a temperature of 90° to 100° C. and maintained at this temperature for 3 hours. With 2 parts of benzoyl peroxide further added to the mixture, the mixture was maintained at the same temperature for 4 hours, whereby the monomers were completely copolymerized. The copolymer thus obtained was allowed to cool, and the resulting solid was pulverized into minus 6-mesh fine particles to obtain an acrylic resin powder.

To 100 parts of the powder were added 13 parts of decanedicarboxylic acid and 1 part of a leveling agent ("Modaflow," product of Mitsubishi Monsanto Chemical Co.). The mixture was melted and kneaded at about 100° C. for 10 minutes with heat rolls, cooled and pulverized to a particle size of 20 to 100 μm to obtain a clear coat composition T-3.

EXAMPLE 1

The following ingredients were made into a mixture by adding them one after another with stirring, and the mixture was further stirred for 1 hour.

| | |
|---|---|
| Al pigmnt concentrate obtained in Prep. Ex. 15 | 48 parts |
| Crosslinking agent H-1 obtained in Prep. Ex. 7 | 131.3 parts |
| Aqueous acrylic resin dispersion obtained in Prep. Ex. 1 | 325 parts |
| Deionized water | 171.7 parts |

To the resulting composition were added 2.9 parts of "Acrysol ASE-60" (thickener, product of Rohm & Haas Co.) and 0.27 part of dimethylethanolamine to prepare a metallic base-coat composition M-1 according to the invention. The composition M-1 had the following characteristics.

| | |
|---|---|
| Apparent viscosity | 3000 cps/6 r.p.m. (B-type viscometer) |
| pH | 7.80 |
| Solids content | 16.8% |

EXAMPLES 2-5 AND COMPARATIVE EXAMPLES 1-3

In the same manner as in Example 1, the ingredients listed in Table 1 below were mixed together. To the mixtures were added 2.9 to 2.1 parts of "Acrysol ASE-60" and 0.27 to 0.20 part of dimethylethanolamine to adjust the mixtures to an apparent viscosity of 3000 cps/6 r.p.m. (B-type viscometer) and a pH of 7.80, giving metallic base coat compositions M-2 to M-8, according to the invention or for comparison, having the solids contents listed in Table 1.

TABLE 1

| Components | Al pigment concentrate (parts) | Crosslinking agent Kind | Crosslinking agent Amount (parts) | Aqueous acrylic resin dispersion (parts) | Deionized water (parts) | Solids content (%) |
|---|---|---|---|---|---|---|
| Example | | | | | | |
| 2 M-2 | 48 | H-2 | 133.3 | 325 | 169.7 | 16.8 |
| 3 M-3 | 48 | H-3 | 135.7 | 325 | 167.3 | 16.7 |
| 4 M-4 | 48 | H-4 | 141.7 | 325 | 161.3 | 16.8 |
| 5 M-5 | 48 | H-5 | 141.7 | 325 | 161.3 | 16.8 |
| Comp. Ex. | | | | | | |
| 1 M-6 | 48 | H-6 | 138.5 | 325 | 164.5 | 16.9 |
| 2 M-7 | 48 | H-7 | 130.9 | 325 | 172.1 | 16.6 |
| 3 M-8 | 48 | H-8 | 135.7 | 325 | 167.3 | 16.7 |

EXAMPLE 6

The following ingredients were pulverized in a porcelain ball mill for 24 hours.

| | |
|---|---|
| Titanium dioxide pigment | 16 parts |
| Phthalocyanine Blue pigment | 8 parts |
| Butyl cellosolve | 25 parts |
| Aqueous acrylic resin solution prepared in Prep. Ex. 2 | 20 parts |
| Hydrophobic melamine resin E | 33.3 parts |

Deionized water (80 parts) was added in small portions to the pigment paste up to 1 μm in particle size and obtained by the above pulverization procedure while stirring the mixture by a dissolver at 1500 r.p.m. The resulting mixture was further stirred for 1 hour to obtain a crosslinking agent. Further with stirring, 325 parts of the aqueous dispersion of acrylic resin obtained in Preparation Example 1 and 31.8 parts of deionized water were added to the mixture. To the mixture were added 2.1 parts of "Acrysol ASE-60" and 0.2 part of dimethylethanolamine to obtain a blue base-coat composition S-1 of the invention having the following characteristics.

| Apparent viscosity | 2500 cps/6 r.p.m. |
|---|---|
| | (B-type viscometer) |
| pH | 7.80 |
| Solids content | 23% |

EXAMPLES 7-16 AND COMPARATIVE EXAMPLES 4-6

The base-coat compositions and the clear-coat compositions prepared by the foregoing procedures were applied to test pieces by the two-coat one-bake method.

The test piece to be coated was prepared by the following pretreatment. A steel plate surface-treated with "Bonderite #3030" (zinc phosphate treating agent, product of Nihon Parkerrizing Co., Ltd.) was electrophoretically coated with "Electron No.9200" (cationic electrophoretic coating composition of the epoxy resin type, product of Kansai Paint Co., Ltd.) serving as a primer, and was further coated with "Amilac N-2 Sealer" (intermediate-coat composition of the aminopolyester resin type, product of Kansai Paint Co., Ltd.).

Each of the base-coat compositions prepared in Examples and Comparative Examples was applied to the test piece twice with a spray gun at a temperature of 25° C. and a relative humidity of 65% or 85%. The first coating was allowed to set for 2 minutes before the second application of the composition. The spray gun was used at an air pressure of 5 kg/cm² and at a composition flow rate of 350 ml/min and was positioned at a distance of 35 cm from the test piece. The test pieces was held in a vertical position during the entire coating operation. The test piece as coated the second time was held in the same environment to stand for 2 minutes, then dried in air at a temperature of 80° C. for 10 minutes and thereafter cooled to room temperature. Subsequently, using a electrostatic gun, the test piece was coated with one of the clear-coat compositions prepared in Preparation Examples 16 to 18. The coating was allowed to set for 5 minutes and then baked at 120° to 140° C. for 30 minutes. In this way, the test piece was coated by the two-coat one-bake method.

Table 2 shows the results obtained by testing the base-coat compositions for the finish of the vertical portion of the resulting coating and for the storage property.

The test methods are as follows.

* Finish of vertical portion

To check sagging (listed as "Sag"), the test piece was formed with a hole, 10 mm in diameter, and the length of sagging of the applied composition at the hole was measured. The mark A represents 0- to 2-mm-long sagging, the mark B 2- to 4-mm-long sagging, and the mark C 4- to 6-mm-long sagging.

The coating was checked for mottling (listed as "Mot") with the unaided eye. The mark A represents almost no mottling, the mark B some mottling, and the mark C marked mottling.

The brightness of the coating was expressed in terms of specific light intensity measured by gloss meter (incident angle 45 deg, and reflect angle 35 deg). The arrangement of particles of the aluminum pigment was evaluated in terms of the intensity.

* Storage property

The composition was stored at a temperature of 40° C. for 20 days, and then checked for viscosity (csp/6 r.p.m., B-type viscometer). The storage property is expressed in the ratio of this viscosity to the initial viscosity.

TABLE 2

| | Base-coat composition | | Clear-coat composition | | Finish of vertical portion | | | | | | Storage property |
|---|---|---|---|---|---|---|---|---|---|---|---|
| | | Dry coat | | Dry coat | R.H. 65% | | | R.H. 85% | | | |
| Item | Kind | thickness | Kind | thickness | Sag | Mot | Br. | Sag | Mot | Br. | |
| Example | | | | | | | | | | | |
| 7 | M-1 | 13–15μ | T-1 | 40μ | A | A | 68 | A | A | 67 | 1.2 |
| 8 | M-2 | 13–15μ | T-1 | 40μ | A | A | 68 | A | A | 66 | 1.1 |
| 9 | M-2 | 13–15μ | T-2 | 40μ | A | A | 69 | A | A | 68 | — |
| 10 | M-3 | 13–15μ | T-1 | 40μ | A | A | 68 | A | A | 65 | 1.1 |
| 11 | M-4 | 13–15μ | T-2 | 40μ | A | A | 70 | A | A | 68 | 1.0 |
| 12 | M-4 | 13–15μ | T-3 | 50μ | A | A | 70 | A | A | 67 | — |
| 13 | M-5 | 13–15μ | T-1 | 40μ | A | A | 68 | A | A | 67 | 1.1 |
| 14 | S-1 | 25–30μ | T-1 | 40μ | A | — | — | A | — | — | 1.2 |
| 15 | S-1 | 25–30μ | T-2 | 40μ | A | — | — | A | — | — | — |
| 16 | S-1 | 25–30μ | T-3 | 50μ | A | — | — | A | — | — | — |
| Comp. Ex. | | | | | | | | | | | |
| 4 | M-6 | 13–15μ | T-1 | 40μ | A | A | 60 | B | B | 58 | 1.1 |
| 5 | M-7 | 13–15μ | T-1 | 40μ | A | A | 65 | C | C | * | ** |
| 6 | M-8 | 13–15μ | T-1 | 40μ | A | A | 67 | C | C | * | 3.2 |

*Not measureable due to sagging.
**Not measureable due to pudding.

Table 2 reveals that in the case of the aqueous coating compositions of the invention, changes in the environmental coating conditions, especially in the humidity condition, produce almost no changes in the finish with respect to sagging and mottling. It is seen that the compositions of the invention increase only slightly in viscosity during storage and therefore have high storage stability.

We claim:

1. An aqueous coating composition characterized in that the composition comprises
   (A) a water-dispersible film-forming acrylic polymer,
   (B) a crosslinking agent prepared by dispersing a hydrophobic melamine resin in water in the presence of a water-soluble resin, the hydrophobic melamine resin being about 18 to about 0.1 in solvent dilution ratio when diluted with a water/methanol solvent mixture (35/65 in weight ratio) and about 500 to about 4000 in weight average molecular weight, and (C) a pigment.

2. A composition as defined in claim 1 wherein the hydrophobic melamine resin in the component (B) is about 800 to about 3000 in weight average molecular weight.

3. A composition as defined in claim 1 wherein the hydrophobic melamine resin and the water-soluble resin in the component (B) are in the ratio of about 20 to about 100 parts by weight of the latter per 100 parts by weight of the former, calculated as solids.

4. A composition as defined in claim 1 which comprises about 8 to about 65 parts by weight, calculated as solids of the melamine resin, of the crosslinking agent (B), per 100 parts by weight, calculated as solids, of the water-dispersible film-forming acrylic polymer (A).

5. A composition as defined in claim 1 wherein the component (C) comprises at least one pigment selected from the group consisting of a metallic pigment and a coloring pigment.

* * * * *